United States Patent [19]

Goodbred

[11] Patent Number: 4,711,589
[45] Date of Patent: Dec. 8, 1987

[54] MANUAL SEAT ADJUSTER WITH CAM LOCK

[75] Inventor: Neil G. Goodbred, Royal Oak, Mich.

[73] Assignee: General Motors Corporation, Detroit, Mich.

[21] Appl. No.: 846,106

[22] Filed: Mar. 31, 1986

[51] Int. Cl.⁴ .......... A47C 1/00; F16C 29/12; F16M 13/00
[52] U.S. Cl. .......... 384/34; 248/429; 296/65 R; 384/40
[58] Field of Search .......... 384/34, 40; 248/429, 248/430; 296/65 R

[56] References Cited

U.S. PATENT DOCUMENTS

| | | | |
|---|---|---|---|
| 1,603,042 | 10/1926 | Geary | 248/429 |
| 2,149,946 | 3/1939 | Whedon et al. | 248/429 |
| 2,899,167 | 8/1959 | Elsner | 248/429 X |
| 3,258,240 | 6/1966 | Kirk | 248/430 |
| 3,853,298 | 12/1974 | Libkie et al. | 248/429 |
| 4,154,422 | 5/1979 | Muhr | 248/429 |
| 4,381,096 | 4/1983 | Roper | 384/34 X |
| 4,487,459 | 12/1984 | Rees | 384/34 |

FOREIGN PATENT DOCUMENTS 1167853 12/1959 France .......... 384/40

Primary Examiner—Stuart S. Levy
Assistant Examiner—Thomas R. Hannon
Attorney, Agent, or Firm—Ernest E. Helms

[57] ABSTRACT

The present invention provides a seat adjuster slide mechanism and method of utilization of the same which is infinitely horizontally adjustable. The seat adjuster slide uses a vertically actuated cam. In its preferred embodiment two opposite surfaces of the cam are utilized and the cam "floats" to equalize the cam angle. Therefore relative movement between the sliding members of the seat adjuster increase the locking force. The present invention also provides a seat adjuster master/-slave slide assembly which utilizes one conventional non-infinitely variable type slider mechanism for the master slider in combination with the vertically actuated cam type slave slider adjuster. Use of the vertically actuated cam slider for the slave slider eliminates the prior alignment problem experienced when using a slave adjuster which is non-infinitely variable.

13 Claims, 8 Drawing Figures

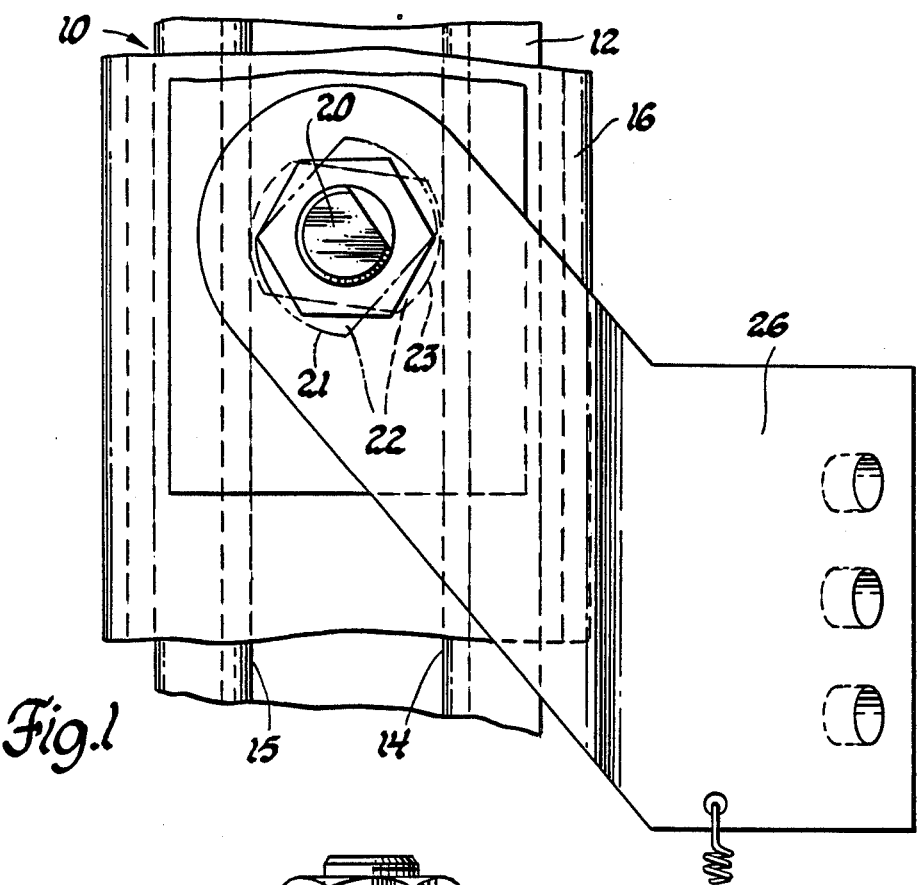
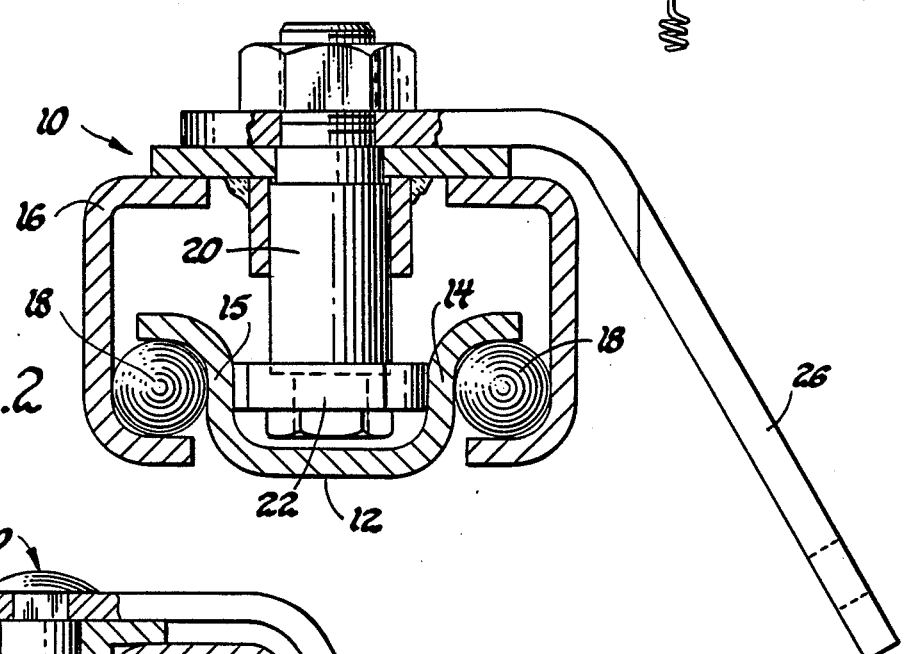
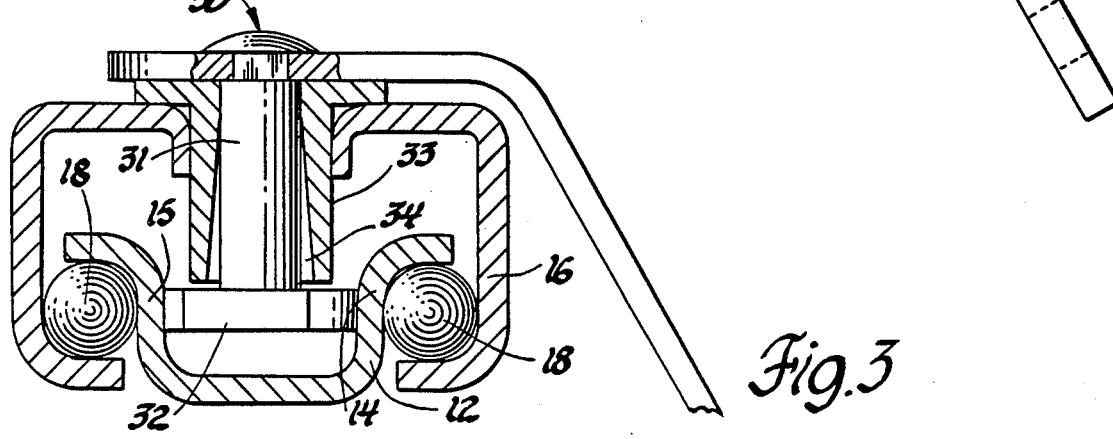

MANUAL SEAT ADJUSTER WITH CAM LOCK

FIELD OF THE INVENTION

The field of the present invention is that of an apparatus and method of utilization of the same of a vehicle seat adjuster slider utilized for horizontally adjustable seats typically of a manual nature. The field of the present invention also encompasses the combination of the master and slave parallel mounted seat slider mechanisms which are placed typically underneath the outboard and inboard sides of the seat and where the vehicle operator typically may engage or disengage the master and slave slider mechanisms by utilizing one operational lever.

DISCLOSURE STATEMENT

Horizontally adjustable vehicle seats are well known in the art. A typical horizontally adjustable seat has an assembly of two generally parallel seat adjuster slides.

There are many different configurations of vehicle seat adjuster slides. However, the typical slider has a floor plate, sometimes referred to as a floor channel, which has slidably mounted thereto a top plate, commonly referred to as seat channel. The seat channel has connected thereto a latching mechanism which is spring biased to selectively engage one of a series of notches or cutouts in the floor channel. A more detailed explanation of a horizontal seat slider mechanism can be gained from a review of Rees U.S. Pat. No. 4,487,459, commonly assigned.

To eliminate the requirement of the vehicle seat occupant maneuvering two separate levers, the latch of the outboard slider (master slider) also controls activation of the latch of the inboard slider (slave slider). Therefore, proper alignment of the slider assembly is critical in both its manufacture and assembly into the vehicle. If proper alignment is not maintained, the slave slider will not properly latch. The above-described condition is often evident when the seat occupant is required to "wiggle" in the seat until the slave adjuster latch can properly engage.

In order to make the proper functioning of the slider assemblies less dependent upon the alignment between the master and slave slider, it is desirable to make the slave slider infinitely variable. To make the slave slider infinitely variable, a camming type mechanical interlock can be provided rather than a notch-type interlock latch.

An example of a camming action interlock for a seat slide adjuster is shown in Whedon et al., U.S. Pat. No. 2,149,946. The configuration of Whedon et al. requires that the latching mechanism be attached with the floor plate. Attaching the latch to the floor plate is disadvantageous to the vehicle operator since the reach to the latch mechanism changes with seat position. Another disadvantage of Whedon et al. is that relative movement between the top plate and floor plate in one direction will increase the camming action whereas relative movement in the opposite direction will work against the camming action. It is desirable to have a camming arrangement wherein relative motion between the top plate and the bottom plate in either direction tends to increase the camming action between the parts therefore increasing the resistance towards further relative movement.

SUMMARY OF THE INVENTION

To overcome the above-noted and other problems, the present invention is brought forth. The present invention provides a seat slide mechanism with a vertically orientated cam connected with the top plate which engages at least one of the vertical legs of the floor plate. In its preferred embodiment, the cam floats to engage two surfaces of the floor plate thereby doubling the restraining force between the top and floor plates. Also since the cam "floats", the camming angle of the cam with both sides of the floor plate remains constant despite any slight misalignment of the slider components.

When a slider of the present invention is utilized as the slave slide adjuster in a master/slave seat slider assembly, the vertically mounted cam allows the slave slide adjuster to be infinitely variable therefore providing greater tolerance of misalignment between the master and slave seat slider adjusters.

It is an object of the present invention to provide a vehicle seat slider structure which in combination has a floor channel for attachment to the vehicle, a seat channel slidably mounted on the floor plate having a section horizontally displaced from the floor channel, a vertically orientated camshaft fixably connected with the seat plate having a slidably attached camplate for equally selectively engaging with the legs of the floor channel at a cam angle between 6 and 10 degrees, and a biased means for imparting angular movement to said camshaft.

It is also an object of the present invention to provide a vehicle seat master/slave slider assembly comprising in combination a master and slave floor plate for attachment to the vehicle wherein the slave floor plate has at least one generally vertical leg, and a master and slave seat plate slidably mounted with each respective floor plate, latching means for engagement with the master floor plate and connected with the master top plate for restraining relative motion thereto between said master floor plate and top plate, and a vertically oriented camshaft fixably connected with said slave top plate for selective engagement with said vertical leg of said slave floor plate, and means for positioning said camshaft also being operationally connected with said master latch means wherein said latch master controls the engagement of the camshaft with said slave floor plate vertical leg.

It is yet another object of the present invention to provide a method of adjusting a seat.

Other objects, desirous and advantage of the present invention will become more apparent to those skilled in the art as the nature of the invention is better understood from the accompanying drawings and a detailed description.

BRIEF DESCRIPTION OF THE DRAWINGS

FIG. 1 is an enlarged partial top elevational view of the slider mechanism illustrating the engaged and non-engaged positions of the cam in phantom.

FIG. 2 is an enlarged front view partially in section of the slider mechanism illustrated in FIG. 1.

FIG. 3 is an enlarged front elevational view partially in section of the slider mechanism with an alternative camshaft.

FIG. 8a is an enlarged view taken along line 8a—8a of FIG. 8.

DETAILED DESCRIPTION OF THE DRAWINGS

Figure 4:
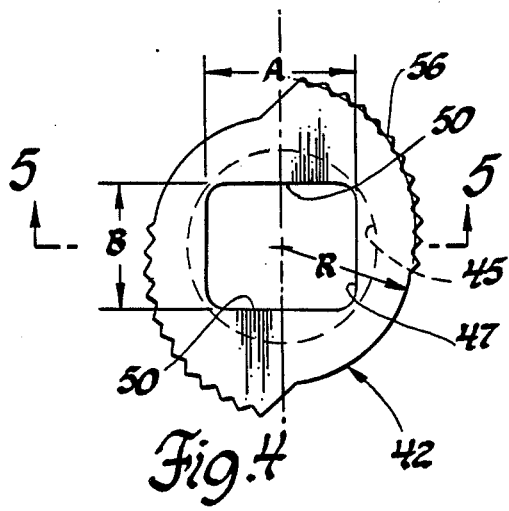
FIG. 4 is an enlarged top elevational view of an alternative camplate.
Figure 5:
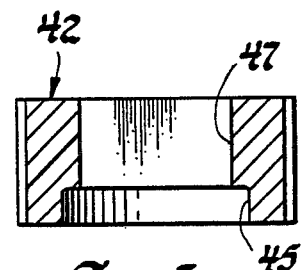
FIG. 5 is an enlarged cross-sectional view taken along line 5—5 of FIG. 4.
Figure 6:
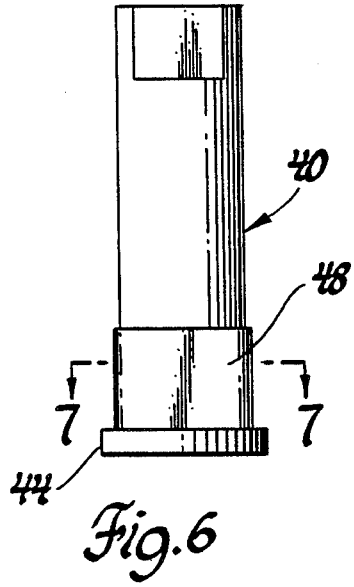
FIG. 6 is an enlarged front elevational view of a camshaft utilized with the camplate of FIG. 4.
Figure 7:
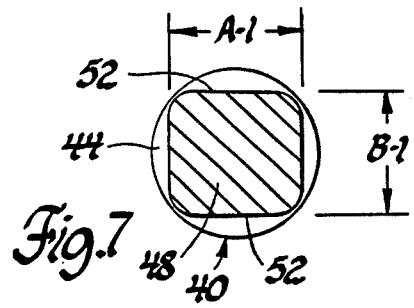
FIG. 7 is an enlarged cross-sectional view taken along line 7—7 of FIG. 6.

Referring to FIGS. 1 and 2, the vehicle seat adjuster slider 10 of the present invention has four major elements. The first element is floor plate referred to for the remainder of this application as the floor channel 12 which provides the means of attachment of the seat adjuster slider 10 to the vehicle floor directly or via another structural member. The floor channel 12 also has in its preferred embodiment two generally straight vertically orientated legs 14 and 15.

The second major element of the slider is the top plate or seat channel 16. The seat channel 16 is slidably mounted to the floor channel 12 thereby allowing relative movement between the seat (which is fixably connected with the seat channel 16) and floor channel 12. In the embodiment illustrated in FIG. 2, seat channel 16 is slidably mounted on the floor channel 12 via the ball bearings 18. However, the present invention does not require the use of ball bearing in the mounting of the seat channel with the floor channel.

The third major member of the invention is the vertically orientated camshaft 20. The vertically orientated camshaft 20 is fixably connected with the seat channel 16. The last major element of slider 10 is adjuster arm 26 which rotates camshaft 20.

Camshaft 20 includes a connected cam plate 22 at its end adjacent floor channel 12. Angular rotation of camshaft 20 places camplate 22 into a position of engagement 23 (locking) with floor channel legs 14 and 15, or in the alternative into a position of nonengagement 21 (non-locking). In usual operation, adjustment arm 26 is biased to place camshaft 20 into a locking position.

In the engaged position 23, camplate 22 engages legs 14 and 15. Therefore, relative movement between the floor channel 12 and the seat channel 16 in either direction will increase the restraining force of the camshaft 20 therefore increasing the force necessary for further relative movement between the seat and floor channels.

For maximum locking force, the camplate 22 should engage legs 14 and 15 at the same cam angle. However, due to tolerances of fabrication of the various element and of assembly, it is very difficult to ensure that the distance from the center line of the camshaft to the channel legs will always be equal.

Referring to FIG. 3, slider 30 has a floating camshaft 31 with an integrally attached camplate 32. Camshaft 31 is fitted within bushing 33 having a nonuniform circumferential clearance 34. In operation camshaft 31 is allowed to slightly wobble in bushing 33 to allow the opposite sides of camplate 32 to engage with legs 14 and 15 at equal cam angles.

Referring to FIGS. 4, 5, 6, and 7, another alternative camshaft is presented. Camshaft 40 when fully assembled has a slidably attached camplate 42 which is mounted over camshaft 40 resting on shoulder 44.

Shoulder 44 has a diameter less than the diameter of cam plate bore 45.

Camshaft 40 also has a rectangular section 48 having dimensions A and B. Camplate 42 has a rectangular bore 47 with dimensions A1 and B1 allowing camplate 42 to fit over camshaft section 48 such that sides 50 and 52 are parallel. Dimension A is deliberately larger than dimension A1 allowing limited relative motion between camplate 42 and camshaft 40. The above relative motion allows camplate 42 to float to equalize the cam angle on both sides of the camplate.

It is usually preferable to have a cam angle between 6 and 10 degrees. The equation to generate the cam profile is:

R (radius) = R (minimum radius) X

A (angle in radians)

For an 8 degree cam angle A=0.1396. Camplate 42 also has the additional feature of serrations 56 to increase the frictional engagement of the camplate 42 with the floor channel vertical legs.

Figure 8:
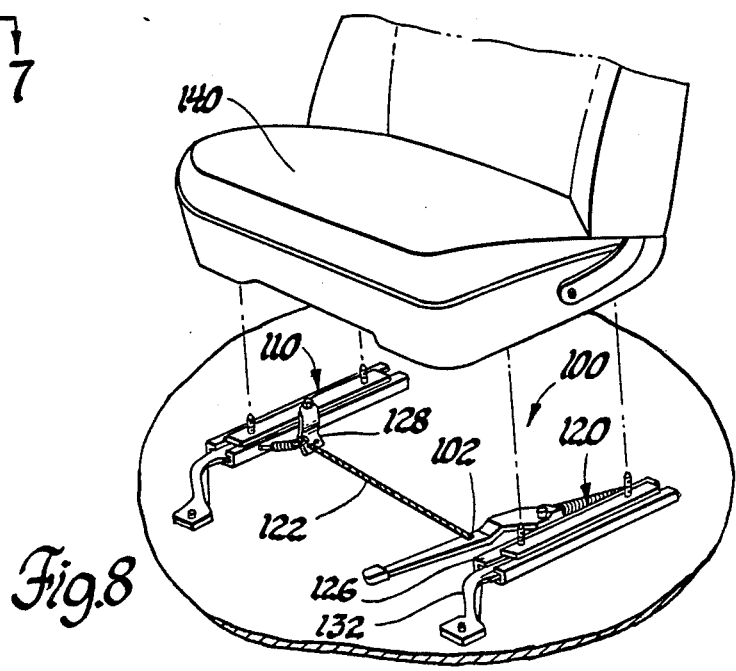
FIG. 8 is an assembly view of a master and slave slider assembly with a seat.

Referring to FIG. 8, the inventive master/slave seat adjuster slider assembly 100 utilizes a vertically projecting cam slider 110 as heretofore described for the slave adjuster, plus a conventional seat slider for the master adjuster 120. The master slider 120 also has a latching mechanism 102 fixably connected with the seat channel 126 which engages with one of a series of notches in the master floor channel 132. Latching mechanism 102 has a connected cable 122 which controls the operation of adjustment arm 128 of the slave slider 110.

In operation, the seat occupant by manual manipulation of the latch 102 releases the latch 102 on the master slider from its biased engaged position to an unengaged position. Since the latch 102 operationally controls the camshaft on the slave slider 110 via adjustment arm 128, releasing latch 102 also brings the camshaft of slave slider 110 to an unengaged position. Therefore, the seat 140 now may be freely adjusted to the desired operator position. Upon release of latch 102 the master slider 120 will relock. Cable 122 will become slack. The cam of slave slider 110 will return to its biased engaged position to lock the slave adjuster. Therefore the seat 140 will now be held steady. Misalignment between the master 120 and slave 110 sliders can now be overcome by the infinitely variable cam locking mechanism of slave slider 110.

The present invention provides a method of adjusting a vehicle seat utilizing a seat channel slidably mounted over a vehicle floor channel, said method including the steps of:

1. sliding said seat channel to a desired position; rotating a vertically orientated camshaft connected with the seat channel to engage with said floor channel.

The method of the present invention in addition to the above enumerated steps includes:

1. equalizing the cam angle of said camshaft with opposite sides of the floor channel.

While a few of the embodiments of the present invention have been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A vehicle seat slide structure comprising in combination:
   a floor plate for attachment to said vehicle having at least one generally straight vertical leg;
   a seat plate slidably mounted on said floor plate having a section horizontally displaced from said floor plate;
   a vertically oriented cam shaft connected with said seat plate with a cam plate for selectively frictionally engaging with said vertical leg; and
   means for imparting angular movement to said camshaft.

2. A seat slide structure as described in claim 1 further including said floor plate having a second generally vertical leg and wherein said plate may mate with both said vertical legs.

3. A seat slide structure as described in claim 1 wherein said cam plate is biased into a position by said camshaft to mate with said vertical leg.

4. A vehicle seat slide structure as described in claim 1 wherein said cam plate engages with said vertical leg at a cam angle between 6 and 10 degrees.

5. A vehicle seat slide structure comprising in combination:
   a floor channel for attachment to said vehicle having generally straight vertical legs;
   a seat channel slidably mounted on said floor channel member having a section horizontally displaced from said floor channel;
   a vertically oriented camshaft connected with said seat plate having a cam plate for selectively frictionally engaging said floor channel vertical legs;
   and means for imparting angular motion to said camshaft, said means including biasing means biasing said camshaft to place said cam plate into a position of mating with said vertical legs.

6. A vehicle seat slide structure as described in claim 5 wherein said cam plate floats to equalize the cam angle at which said cam plate engages with said floor channel vertical legs.

7. A vehicle seat slide adjuster structure as described in claim 6 wherein said camshaft is held in a bushing with a non-uniform circumferential clearance and said shaft may move to a position to equalize the cam angle on both sides of said plate with said vertical legs.

8. A vehicle seat slide adjuster structure as described in claim 6 whenever said camshaft has a slidably attached cam plate.

9. A vehicle seat slide structure comprising in combination:
   a floor channel for attachment to said vehicle having generally straight vertical legs;
   a seat channel slidably mounted on said floor channel member having a section horizontally displaced from said floor channel;
   a vertically oriented camshaft connected with said seat plate, said camshaft having a slidably attached cam plate for selectively equally engaging said vertical legs at a 6 to 10 degree cam angle; and
   means for imparting angular motion to said camshaft biasing said cam plate to an engaging position with said vertical legs.

10. A vehicle seat horizontal adjustment assembly having a master seat side structure and a slave seat side structure comprising in combination;
    a notched master floor plate and a slave floor plate for attachment to said vehicle, said slave floor plate having at least one generally vertical leg;
    master and slave seat plates slidably mounted on said respective floor plate having a section horizontally displaced from said respective floor plate;
    latch means connected with said master seat plate for selectively engaging a notch in said master floor plate to restrain relative motion between said maater seat plate and said master floor plate;
    a vertically oriented camshaft fixably connected with said slave seat plate for selectively engaging with said vertical leg;
    means for imparting an angular movement to said camshaft; and
    means operatively connecting said latch means with said means for imparting angular motion to said camshaft wherein the engagement of said latch means controls the engaging of said camshaft with said vertical leg.

11. A master/slave seat adjuster combination as described in claim 10 wherein said latch means is biased in a position preventing relative motion between said master floor plate and said master seat plate.

12. A method of adjusting a vehicle seat utilizing a seat channel slidably mounted over a generally straight vehicle floor channel, said method comprising:
    sliding said seat channel to a desired position;
    rotating a vertically orientated seat channel connected camshaft, with a connected cam plate to frictionally engage said cam plate with said generally straight floor channel.

13. A method to adjust a vehicle seat as described in claim 12 further including equalizing the cam angle said cam plate engages with said floor channel on a floor channel with two opposing sides.

* * * * *